(12) United States Patent
Soerensen (10) Patent No.: US 9,935,434 B2
(45) Date of Patent: Apr. 3, 2018

(54) COOLING APPARATUS

(71) Applicant: SIEMENS AKTIENGESELLSCHAFT, München (DE)

(72) Inventor: Johnny Soerensen, Videbæk (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/122,984

(22) PCT Filed: Mar. 27, 2015

(86) PCT No.: PCT/EP2015/056769
§ 371 (c)(1),
(2) Date: Sep. 1, 2016

(87) PCT Pub. No.: WO2015/150277
PCT Pub. Date: Oct. 8, 2015

(65) Prior Publication Data
US 2017/0077687 A1   Mar. 16, 2017

(30) Foreign Application Priority Data

Mar. 31, 2014 (DE) .................. 10 2014 206 000

(51) Int. Cl.
*F03D 9/00* (2016.01)
*H02P 9/04* (2006.01)
(Continued)

(52) U.S. Cl.
CPC ............. *H02G 3/03* (2013.01); *F03D 9/257* (2017.02); *H02G 9/025* (2013.01); *H02G 9/06* (2013.01)

(58) Field of Classification Search
USPC ..................... 290/44, 55; 174/15.6
See application file for complete search history.

(56) References Cited

U.S. PATENT DOCUMENTS 2,306,850 A * 12/1942 Usselman ............... H01B 7/29
174/15.6
3,671,622 A * 6/1972 Humphries .............. B05D 7/20
264/263
(Continued)

FOREIGN PATENT DOCUMENTS

CN   2168323 Y   6/1994
CN   201122454 Y   9/2008
(Continued)

OTHER PUBLICATIONS

Siemens AG; "Künstlich gektühlte Kabel bis 420kV"; pp. 1-14; Bestell-Nr. J 113/1057; 1976; (translation will follow).
(Continued)

*Primary Examiner* — Pedro J Cuevas
(74) *Attorney, Agent, or Firm* — Schmeiser Olsen & Watts LLP (57) ABSTRACT

A cooling device for cooling a cable assembly, containing an outer pipe, which is designed to accommodate the cable assembly in such a way that an intermediate space for accommodating a cooling water layer remains between the outer pipe and the cable assembly, a connecting element for creating a water-tight connection between the outer pipe and the cable assembly, and a pressure controller for controlling the water pressure in the cooling water layer, is provided. A cable device is also provided, including an electric cable assembly, and a cooling device. A wind farm is also provided, including a number of cable assemblies for transmitting electrical power from wind turbines and including a number of cooling devices for cooling the cable assemblies A method for providing a cooling device for a cable assembly is further provided.

15 Claims, 5 Drawing Sheets

(51) Int. Cl.
*H02G 3/03* (2006.01)
*H02G 9/06* (2006.01)
*H02G 9/02* (2006.01)
*F03D 9/25* (2016.01)
*H01B 7/42* (2006.01)
*H01B 9/06* (2006.01)
*H02G 15/20* (2006.01)

(56) References Cited

U.S. PATENT DOCUMENTS

| | | | | |
|---|---|---|---|---|
| 3,736,364 A | * | 5/1973 | Kubo | H01B 7/423 |
| | | | | 165/104.25 |
| 3,946,141 A | * | 3/1976 | Schmidt | H01B 7/423 |
| | | | | 137/340 |
| 3,955,042 A | * | 5/1976 | Kellow | H01B 7/29 |
| | | | | 165/104.26 |
| 3,962,529 A | * | 6/1976 | Kubo | H01B 7/29 |
| | | | | 165/104.21 |
| 4,105,860 A | | 8/1978 | Ball | |
| 4,607,133 A | * | 8/1986 | Alloin | H01B 9/001 |
| | | | | 174/15.6 |
| 4,690,718 A | * | 9/1987 | Laugs | H01B 13/323 |
| | | | | 156/244.12 |
| 4,992,623 A | * | 2/1991 | Briley | H01B 12/12 |
| | | | | 174/15.4 |
| 5,442,131 A | * | 8/1995 | Borgwarth | H01B 7/425 |
| | | | | 165/104.33 |
| 5,591,937 A | | 1/1997 | Woody | |
| 5,670,860 A | * | 9/1997 | Conrady | H01B 7/423 |
| | | | | 320/109 |
| 5,985,385 A | * | 11/1999 | Gottfried | B32B 1/08 |
| | | | | 405/157 |
| 7,009,103 B2 | * | 3/2006 | Pitschi | H01P 3/06 |
| | | | | 174/15.1 |
| 7,453,041 B2 | * | 11/2008 | Maguire | H01B 12/16 |
| | | | | 174/15.4 |
| 7,805,954 B2 | * | 10/2010 | Yamanaka | H01P 1/203 |
| | | | | 361/702 |
| 2013/0341934 A1 | * | 12/2013 | Kawanishi | B60L 8/00 |
| | | | | 290/1 A |
| 2016/0358697 A1 | * | 12/2016 | Soerensen | G02B 6/4486 |

FOREIGN PATENT DOCUMENTS

| | | |
|---|---|---|
| CN | 202512911 U | 10/2012 |
| DE | 2252925 A1 | 5/1974 |
| JP | 2011229335 A | 11/2011 |

OTHER PUBLICATIONS

International Search Report for PCT Application No. PCT/EP2015/056769, dated Sep. 2, 2015.

* cited by examiner

COOLING APPARATUS

CROSS-REFERENCE TO RELATED APPLICATIONS

This application claims priority to PCT Application No. PCT/EP2015/056769, having a filing date of Mar. 27, 2015, based off of German application No. 102014206000.1 having a filing date of Mar. 21, 2014, the entire contents of which are hereby incorporated by reference.

FIELD OF TECHNOLOGY

The following describes a cooling apparatus for cooling a power-cable apparatus.

BACKGROUND

A power-cable arrangement configured for carrying electric power generally comprises at least one protective envelope or casing. For example, it is possible for the energy conductors which originate at a generator to be provided individually with an insulating envelope and to be encased in a bundled state by a robust cable-protecting envelope made of HDPE (high-density polyethylene) or a similar plastic. A power-cable arrangement usually comprises a plurality of energy conductors, in particular made of copper, which are accommodated within the cable-protecting envelope and are embedded therein in a water-tight manner and such that they are protected against mechanical and chemical damage.

As far as a wind farm is concerned, a power-cable arrangement serves, for example, for transmitting power between wind turbines of the wind farm and/or between a wind turbine and an electric power transformer station. It is generally the case that the power cables leave the wind turbine in the lower region thereof, for example downstream of a switchgear unit arranged in the lower tower region or in the upper region of a load-bearing structure. This transition is usually referred to as "cable hangoff". The load-bearing structure may be, for example, a tripod or pile foundation anchored in the sea bed. If the wind turbine is offshore, the power-cable arrangement is laid generally in the form of a submarine cable or offshore cable on or in the sea bed. In order to avoid the costs which would follow from the power-cable arrangement being damaged, said power-cable arrangement is generally also laid, in addition, in a further protective pipe.

The energy conductors of a power-cable arrangement are heated up in particular when they carry high-voltage current, and it is therefore usually desirable for the resulting heat to be dissipated. If a power-cable arrangement is laid in the form of a submarine cable, the portion which is laid under water is cooled relatively effectively. The power-cable arrangement of a wind turbine is usually laid such that the power-cable arrangement leaves the lower end of the tower and is routed into the sea. The tower is generally installed on a support—for example on a tripod and the lower end of the tower is therefore located some meters above the sea level. The tower, exposed to wave movement, is thus protected against impact. Accordingly, that portion of the power-cable arrangement which is exposed to the air is cooled only to an insufficient extent, in particular when the wind turbine is operating at full, or more or less full, power. As mentioned above, the temperature of a power cable rises under increased current load, and therefore the conductivity of the power cable decreases as the temperature rises. In order to be able to carry sufficient current even under high loading, it is therefore necessary for the diameter of the power cable to be appropriately large. Nevertheless, it is possible for disadvantageous "hot spots" to arise in the energy conductors, and the transmission of power is impaired. In order to avoid such "hot spots" in the power-cable arrangement of a wind turbine, it is necessary for the power of the latter to be restricted, and this, in turn, adversely affects the output of the wind farm. In order for it to be possible for action to be taken in good time, in the case of a known procedure, the cable temperatures are monitored using fiber-optic sensors. In particular in the case of a wind farm having a multiplicity of wind turbines, such temperature monitoring can be very complex and expensive.

SUMMARY

An aspect relates to providing improved and cost-effective power-cable cooling.

The cooling apparatus according to embodiments of the invention for cooling a cable arrangement, in particular a power-cable arrangement, contains an outer pipe, which is configured to accommodate the cable arrangement such that an interspace for accommodating a layer of cooling water remains between the outer pipe and cable arrangement, a connecting element for establishing a water-tight connection between the outer pipe and cable arrangement, and a pressure regulator for regulating the water pressure in the layer of cooling water.

One advantage of the cooling apparatus according to embodiments of the invention resides in that a heated-up cable in the cable arrangement can always advantageously be cooled, since water has a heat-conducting property. A further advantage of the cooling apparatus according to embodiments of the invention resides in that the layer of water is retained by the connecting element. It is also advantageous that the water pressure can be adapted by the pressure regulator, for example so that any air pockets which may occur are displaced by cooling water. In addition, it is readily possible, as will be explained in detail hereinbelow, for an evaluation of the water pressure to provide important information in respect of the sealing of the cooling apparatus, of cable temperature, etc.

The interspace is preferably formed at least on one side of the cable arrangement, but preferably all the way around, and therefore the layer of cooling water can effectively form an envelope of water around the cable arrangement. This ensures that the cable arrangement is surrounded by cooling water from all sides.

The cooling apparatus according to embodiments of the invention comprises a cable arrangement, in particular a power-cable arrangement, and a cooling apparatus according to embodiments of the invention.

The wind farm according to embodiments of the invention contains a number of cable arrangements for transmitting electric power from wind turbines and also a number of cooling apparatuses according to embodiments of the invention for cooling the cable arrangements.

One advantage of the wind farm according to embodiments of the invention resides in that heated-up power cables in the cable arrangements can always advantageously be cooled. It is thus possible to avoid any restriction of the power of one or more wind turbines on account of disadvantageous overheating of one or more energy conductors.

The method according to embodiments of the invention of providing a cooling apparatus for a cable arrangement contains the following steps as claimed in patent claim 14:

1) accommodating the cable arrangement in an outer pipe so that an interspace for accommodating a layer of cooling water remains between the outer pipe and cable arrangement;
2) establishing a water-tight connection between the cable arrangement and outer pipe;
3) filling the interspace with a layer of water; and
4) regulating the water pressure in the layer of water.

One advantage of the method according to embodiments of the invention resides in that effective cooling can be achieved in a cost-effective and straightforward manner. The outer pipe used can be a straightforward, easily obtainable pipe. In particular in the case of a cooling apparatus for a submarine cable, it is possible to use a protective pipe which is already present. A further advantage resides in that straightforward water can be used as the cooling means, and therefore cooling can be carried out without the environment being harmed.

The dependent claims and the description which follows contain particularly advantageous developments and configurations of embodiments of the invention, wherein in particular it is also possible for the claims from one category of claims to be developed in a manner analogous to the dependent claims from another category of claims.

As mentioned in the introduction, a cable arrangement may comprise a plurality of energy conductors. It is also possible for a cable arrangement to comprise a plurality of data links, in particular made of copper or glass fibers or plastic fibers. The term "cable arrangement" is to be understood hereinbelow to mean predominantly a power-cable arrangement, it also being possible, of course, for the cable arrangement to route any desired number of data links. The cooling apparatus according to embodiments of the invention serves predominantly for cooling the energy conductors, since the latter carry usually high-voltage current and can be heated during operation. In the case of the cooling apparatus according to embodiments of the invention, the outer pipe is not necessarily the outermost pipe, and it is within the realms of possibility to use further casings or protective envelopes.

It is assumed hereinbelow that the wind farm according to embodiments of the invention comprises at least one offshore wind turbine. It is also assumed that a cable arrangement or cable apparatus extends from a "cable hangoff" on the tower of an offshore wind turbine, through an air space, into the sea. As described in the introduction, the cable arrangement leaves the wind turbine usually in the region of a switchgear unit in the lower tower region or in the upper region of a load-bearing structure. A cable arrangement has usually two end points, i.e. the cable arrangement extends between two end points. That portion of the cable arrangement which is to be cooled is defined by appropriate placement of one or more connecting elements. If a connecting element is fitted at each of the two ends, or at the end points, of a cable arrangement, the cable arrangement can be cooled between these two connecting elements. It is assumed hereinbelow that the cooling apparatus extends between the two end points of a cable arrangement. For example, it is possible for a cable arrangement to be laid between two wind turbines, and therefore the cooling apparatus according to embodiments of the invention also extends between the two wind turbines. However, it is also possible, of course, for the cooling apparatus to begin at such an end point, but to terminate at another kind of end point, for example at an offshore or onshore transformer station.

A connecting element is particularly preferably arranged in the region of an end point of the cable arrangement, i.e. in the region where the cable arrangement originates. Such an end point may be arranged at some distance, e.g. 3 m-10 m, from the "cable hangoff". Since the envelope of cooling water should preferably enclose a region which tends to form heat, the connecting element can be placed correspondingly. In a further preferred embodiment, an end point of the cable arrangement may be arranged on a wind turbine. For example, it is possible for the cable arrangement to originate at the lower region of the tower of a wind turbine. In this case, a connecting element may be fitted on the cable arrangement so that it is advantageously in the vicinity of the tower. A large part of the cable arrangement—which is otherwise exposed to the air—can thus be effectively cooled, this therefore doing away with the occurrence of "hot spots" in this region. The advantageous cooling is achieved in that a connecting element is arranged above the water level or the sea level, and it is therefore also the case that that portion of the power-cable arrangement which is arranged above the water level is always surrounded by cooling water. A further advantage of this arrangement resides in that, on account of the optimal cooling, the diameter of the power cable can be smaller than in the case of the conventional apparatuses in which the cable arrangement is exposed to the air and thus cannot be cooled to a sufficient extent.

As mentioned in the introduction, the connecting element (also referred to hereinbelow as "connector") serves for establishing a water-tight connection between the outer pipe and cable arrangement. Such a water-tight connection can be achieved by appropriate screw connection or adhesive bonding. In order to compensate for the difference in size between the cable arrangement and outer pipe, the internal diameter of the outer pipe can be reduced by being tapered to the external diameter of the cable arrangement. These can then be screwed or adhesively bonded to one another. As an alternative, it is possible for the space or distance between an outer surface of the cable arrangement and an inner surface of the outer pipe to be bridged by a suitable transition piece. This transition piece can be connected in any desired suitable manner to the cable arrangement and the outer pipe. In a particularly preferred variant of embodiments of the invention, however, the connecting element is adapted to the different diameter of the outer pipe and/or of the cable arrangement. For example, an internal diameter at one end of the connecting element can correspond to the external diameter of the outer pipe. At the other end of the connecting element, the internal diameter can correspond to the external diameter of the cable arrangement. In one possible variant, it is possible for the connecting element to be produced in the form of a funnel-like element. As an alternative, the connecting element may be in step-like form.

In a particularly preferred variant of embodiments of the invention, the connecting element comprises a weld-seam-connecting device for establishing a weld-seam connection between the cable arrangement and the outer pipe. The weld-seam-connecting device may be realized, for example, in the form of an electrofusion device. For this purpose, at least one heating element is embedded in annular form in the connector and provided with conductors which lead to the outside, it therefore being possible for an appropriate voltage to be applied to the heating element. If the outer pipe and the outer casing of the cable arrangement consist of HDPE, rapid and full annular fusion of the two can take place in this way. Such a connection has been proven to be reliable and dimensionally stable and can be implemented within a short period of time. As already mentioned, the connecting element may be in step-like form, in order to bridge the difference in size between the cable arrangement and the outer pipe. In a particularly preferred variant of embodiments of the invention, the weld-seam connection comprises a first weld seam, which is arranged between the connecting element and the outer pipe, and a second weld seam, which is arranged between the connecting element and the cable arrangement.

The cooling water can be introduced prior to the connecting element being fitted. For example, the interspace can fill with sea water when the cable is being laid. Once the connecting elements have been fitted at one end point, or at both end points, of the cable arrangement, air can be displaced from the resulting cavities by a subsequently introduced liquid. Therefore, in a particularly preferred variant of embodiments of the invention, the cooling apparatus contains an entry opening for the subsequent introduction of a liquid into the interspace. For example, the connecting element may have at least one such entry opening.

The cooling water used may be water or sea water. In a particularly preferred variant of embodiments of the invention, however, a brine is introduced. For example, it is possible to introduce a saturated salt solution with a salt content of approximately 26%. Such a saturated salt solution used as cooling water provides the cable arrangement with an advantageously high level of static buoyancy, and therefore the cable arrangement does not rest on the floor of the outer pipe. Instead, the cable arrangement floats in the interspace. This ensures that the cable arrangement is surrounded all the way round by cooling water, and that optimum cooling can be achieved. The floating arrangement in the brine has the additional advantage that wear is effectively reduced.

In a preferred variant of embodiments of the invention, the pressure regulator can be connected to the entry opening. Following introduction of the cooling water into the space between the cable arrangement and outer pipe, adaptation of the water pressure can then take place. For example, water can be pumped in until a satisfactory water pressure is reached. This is a highly reliable way of achieving the situation where all the air pockets are driven or forced out of the interspace.

As mentioned in the introduction, the temperature of an energy conductor (and, consequently, also the ambient temperature in the cable arrangement) can rise considerably if the energy conductor should carry a strong electric current. In the case of the cooling apparatus according to embodiments of the invention, the power-cable arrangement is surrounded by an envelope of water. If the water temperature rises, this results in an increase in the pressure. In a particularly preferred variant of embodiments of the invention, the cooling apparatus contains a pressure-monitoring unit for monitoring the water pressure in the envelope of cooling water. For example, in a preferred exemplary embodiment, it is possible for the pressure-monitoring unit to be realized in the form of an expansion tank. Such an expansion tank can be fitted at any desired location. It is preferable, however, for the expansion tank to be connected to the entry opening of a connecting element. If the pressure-monitoring unit is fitted at some other location, the entry opening preferably comprises a valve or some other possible closure, so that the cooling apparatus can be closed in an essentially water-tight manner once the cooling water has been introduced and the water pressure has been adjusted.

The development of the water pressure—whether the water pressure rises or drops—can be ascertained in any desired manner. For example, it would be possible for the expansion tank to have a transparent surface, so that visual monitoring of the water pressure can take place. It is preferable, however, for the pressure-monitoring unit to comprise a pressure indicator, which can pass on information in respect of the water pressure in a suitable form. If the pressure-monitoring unit is located, for example, on an offshore wind turbine, it is possible for an automatic pressure indicator to communicate information to a control unit of the wind farm. Communication can take place, for example, via a wireless connection. In a particularly preferred variant of embodiments of the invention, the wind farm comprises a control device for controlling the wind turbines in accordance with a pressure monitored in the envelope of water of the cooling apparatus. For example, it is possible for a plurality of cable arrangements of the number of wind turbines each to be equipped with a cooling apparatus according to embodiments of the invention. Each of these cooling apparatuses, or just a number of these cooling apparatuses, may be equipped with a pressure-monitoring unit. Information from the pressure-monitoring units can be evaluated in the control device. With the information indicates a moderate water pressure despite a high level of power, fault-free functioning of the water cooling can be assumed. However, if the information indicates an increased water pressure as a result of very pronounced heating of the energy conductors, the control device can adapt the power of the wind turbines correspondingly. If the information indicates a pressure loss, the control device can conclude that there is a leak in the cooling-water apparatus. For example, the outer pipe may be damaged by external influences. The information from the pressure-monitoring unit can be evaluated in order for such damage to be rapidly detected.

The outer pipe (with the cable arrangement) can be laid on the sea floor and/or can be partly or wholly buried in the sea floor. Depending on the nature of the route over which it is laid, the outer pipe may follow a uniform path, but may also have to be routed over elevations and dips. If the path is not uniform, air pockets may occur in the outer pipe. For this reason, it is possible in the case of the method according to embodiments of the invention, preferably prior to step 1), to implement an additional step in order for air pockets to be washed out of the outer pipe. It is possible for this purpose, once the interspace has been made water-tight, for water to be introduced into the interspace, and for said water to be subjected to pressure at one end (for example in the region of a connecting element) such that any air pockets which may be present are driven out.

It is also possible for dirt or other extraneous material to enter into the outer pipe when the latter is being laid. For this reason, it is possible in the case of the method according to embodiments of the invention, preferably prior to step 1), for a pig to be guided through the outer pipe in order for the latter to be cleaned. The pig can be introduced in the customary manner at one end of the outer pipe and removed again at the other end. A person skilled in the art will be familiar with corresponding details of pigging.

The invention will be explained in more detail once again hereinbelow with reference to the accompanying figures and by way of exemplary embodiments. The various figures provide like components with identical reference signs. The figures are usually not to scale.

BRIEF DESCRIPTION

Some of the embodiments will be described in detail, with reference to the following figures, wherein like designations denote like members, wherein.

DETAILED DESCRIPTION

Figure 1:
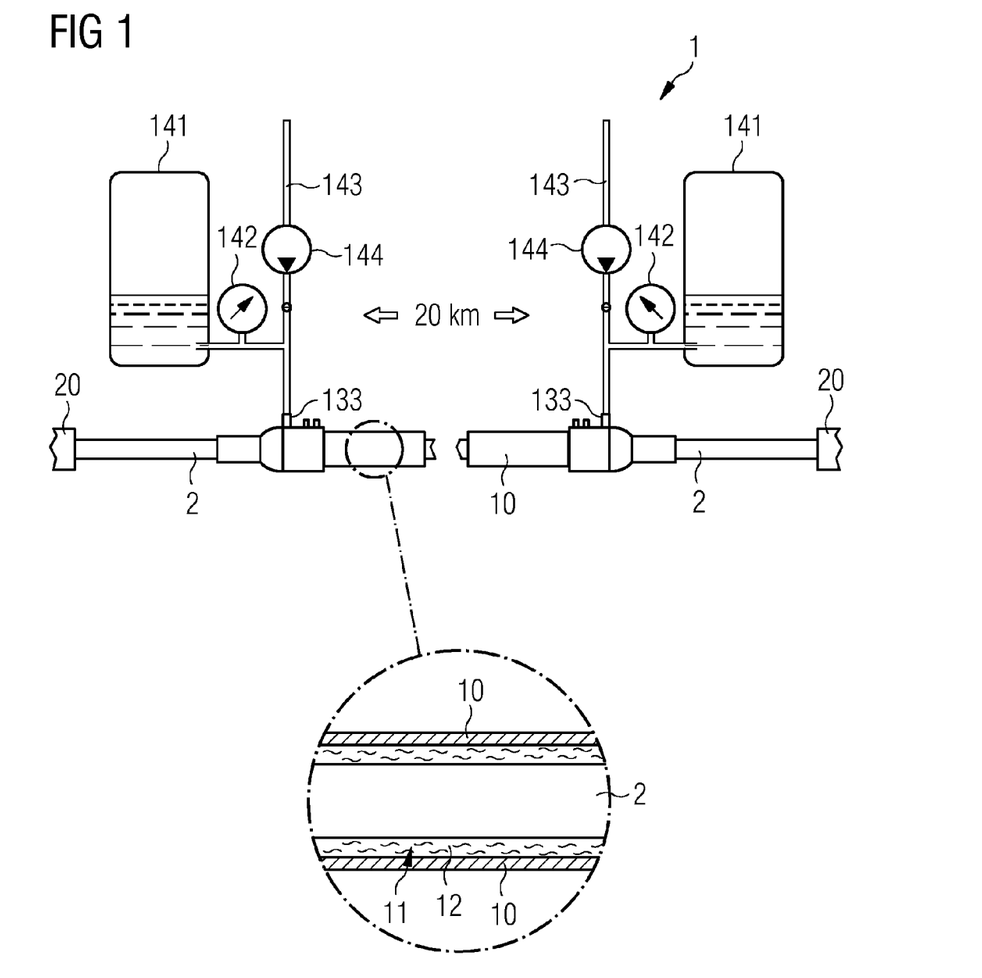
FIG. 1 shows an exemplary embodiment of a cooling apparatus.

FIG. 1 shows an exemplary embodiment of a cooling apparatus 1 according to the invention which comprises an outer pipe 10, which is arranged around a cable arrangement 2. The cable arrangement 2 may be of any desired length and can extend over a number of kilometers between its two end points 20. The cable arrangement 2 serves, in particular, as an energy source and routes a number of energy conductors for carrying high-voltage current, e.g. at a voltage of 33 kV or 66 kV. It is, of course, also possible for the cable arrangement 2 to comprise any desired number of data carriers. An envelope 12 of cooling water is retained between the outer pipe 10 and the cable arrangement 2 by two connecting elements 13. The latter form a water-tight connection between the outer pipe 10 and cable arrangement 2. Cooling water or filling water can be introduced through an entry opening 133. A cable arrangement 2 floating in a brine 12 is shown in the enlarged region of the drawing. For example, a brine with approximately 26% saturation provides the cable arrangement 2 with sufficient buoyancy for the latter to be "suspended" in the cooling water 12 and to be prevented from resting on the floor of the outer pipe 10. The water pressure in the envelope 12 of cooling water is regulated by a supply line 143 and a pump 144 and is monitored by an expansion tank 141 and a pressure-measuring device 142.

Figure 2:
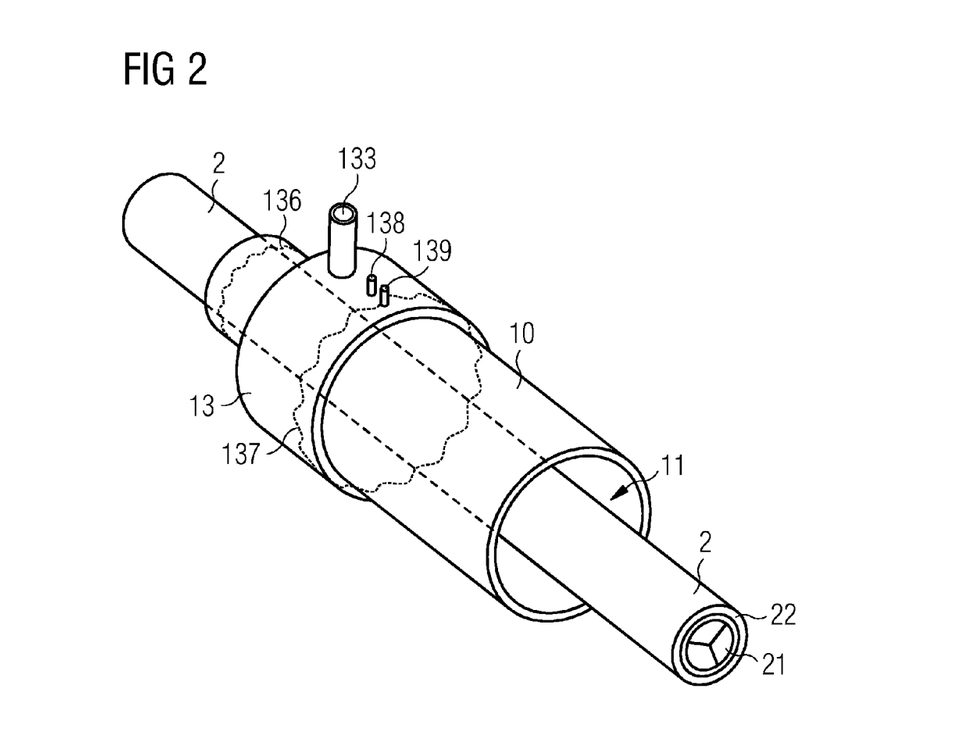
FIG. 2 shows a perspective illustration of an embodiment of a part of the cooling apparatus from FIG. 1.
Figure 3:
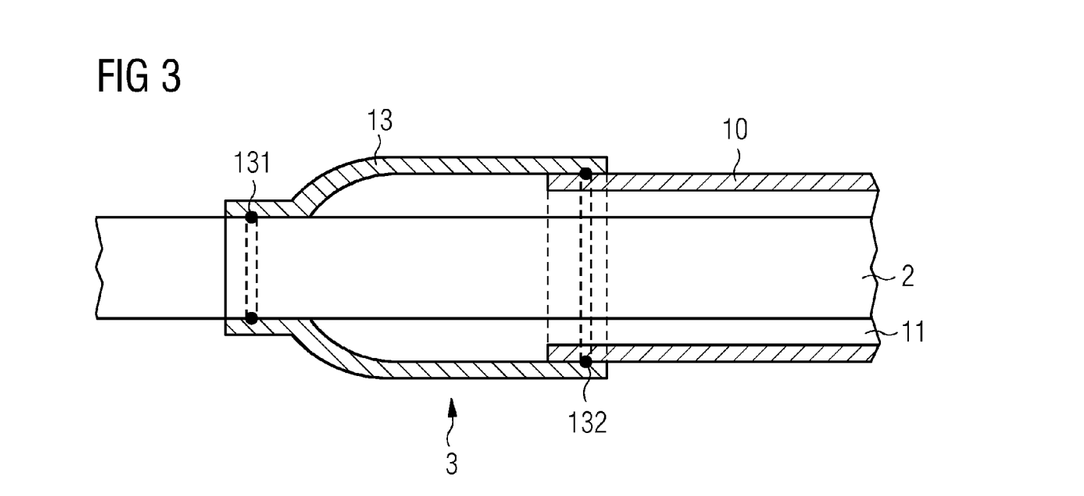
FIG. 3 shows a cross section through an embodiment of an end region of the cooling apparatus from FIG. 1.

FIG. 2 shows a perspective illustration of part of the cooling apparatus 1 from FIG. 1, with an outer pipe 10 positioned around a cable arrangement 2. In this example, the cable arrangement 2 comprises, as is customary, a plurality of energy conductors 21 and is protected by a plastic casing 22 made of HDPE. The outer pipe 10 also consists of a plastic such as HDPE. The connecting element 13 contains a weld-seam-connecting device, which comprises two embedded heating coils 136, 137 and electric conductors 138, 139. Around the material of the connecting element 13 with the material of the outer pipe 10 and/or the casing 22 of the cable arrangement 2, an electric voltage is applied to the conductors 138, 139. The resulting formation of heat in the heating coils 136, 137 results in the desired fusion of the plastic. The weld-seam connections 131, 132 are shown in FIG. 3. The resulting cavity 11, in which an envelope of water is retained, is also shown here. A similar connecting element 13 with an outer pipe 10 and cable arrangement 2 can also be fused at the other end of the cable arrangement 20. It is, of course, possible for a water-tight termination to be realized in any desired manner. The outer pipe 10 and the connecting elements 13 of the cooling apparatus 1 form, together with the cable arrangement 2, a cable apparatus 3 according to the invention.

Figure 4:
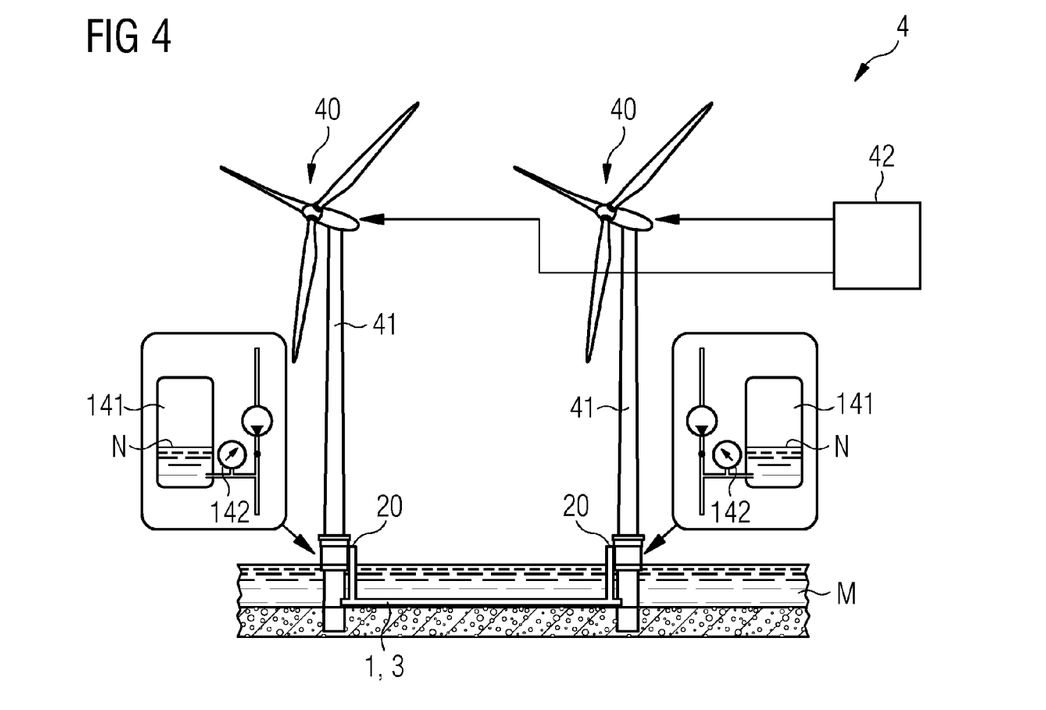
FIG. 4 shows a further exemplary embodiment of a cooling apparatus in a first state.

FIG. 4 shows a further exemplary embodiment of the cooling apparatus 1 according to the invention. In this example, the cable arrangement 2 extends between two wind turbines 40 of an offshore wind farm 4. One end point 20 of the cable arrangement 2 is located on the tower 41 of one wind turbine 40, and so a portion of the cable arrangement 2 extends between the tower 41 and sea M. A connecting element (for the sake of clarity, not illustrated in the figure) of the cooling apparatus 1 is fitted on this portion, preferably as close to the tower 41 as possible. This means that this portion of the cable arrangement 2 is also effectively cooled by water. The water pressure in the interspace of the cooling apparatus 1 is monitored. For this purpose, a pressure-measuring unit 142 can report measured values to a control device 42 at regular intervals and/or on demand. The figure shows the cooling apparatus 1 in a first state. Here, the water level of the expansion tank 141 is in a normal state, or the water is at a normal level N, and there is therefore no need for the control device 42, which regulates the power of the wind turbines 40, to start limiting or restricting the power.

Figure 5:
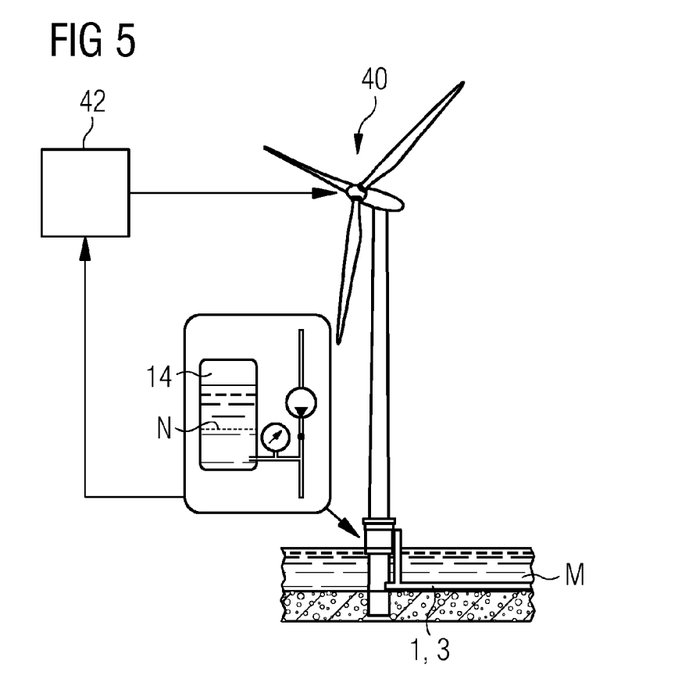
FIG. 5 shows an embodiment of the cooling apparatus from FIG. 3 in a second state.

FIG. 5 shows a cooling apparatus 1 in a second state. Here, the water level in the expansion tank has risen. This rise above the normal level N goes hand in hand with an increase in water pressure and indicates an increase in the water pressure in the cooling apparatus. This, in turn, indicates an undesirably high temperature in the energy conductors. As described above, the pressure-measuring unit 142 can report the values to a control device, which regulates the power of the wind turbine 40 correspondingly.

Figure 6:
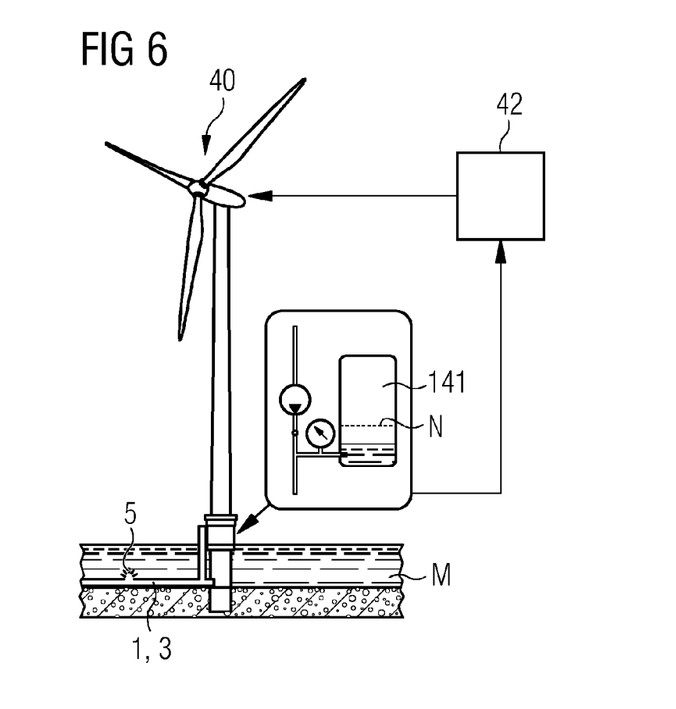
FIG. 6 shows an embodiment of the cooling apparatus from FIG. 3 in a third state.

FIG. 6 shows a cooling apparatus 1 in a third state. Here, the water level in the expansion tank has dropped to a pronounced extent, and below the normal level N. As described above, the pressure-measuring unit 142 can report the pressure values to a control device. Such a pressure loss may indicate, for example, a leak 5 in the outer pipe 10. Using the information, a wind-farm operator can rapidly locate the leak in order to be able to take the necessary action.

Figure 7:
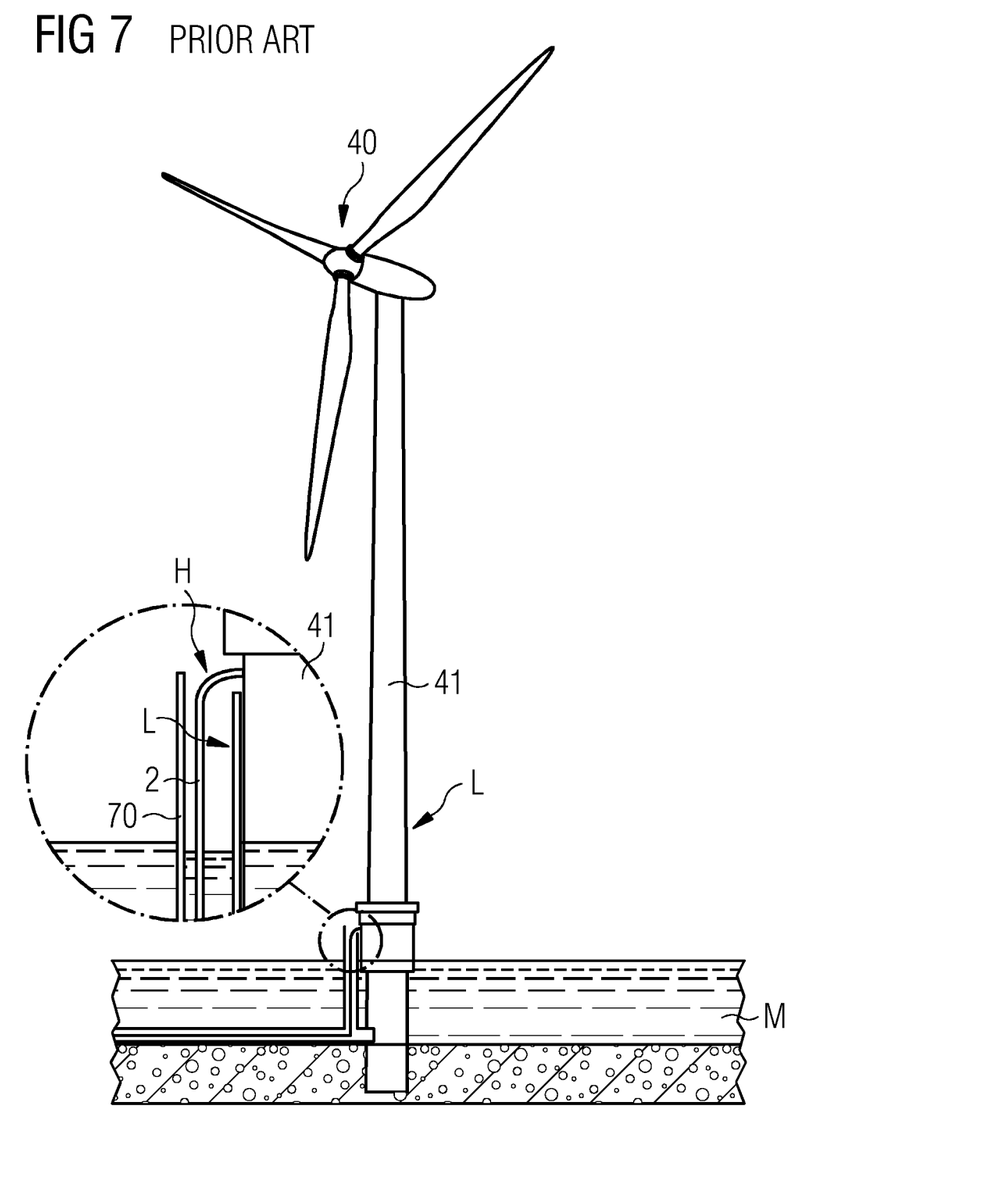
FIG. 7 shows a cable arrangement according to the prior art.

FIG. 7 shows a cable apparatus according to the prior art. Here too, the cable arrangement 2 runs from the tower 41 of the wind turbine 40 in the direction of the sea. The cable arrangement 2 is laid in an outer pipe 70, which serves for protecting the cable arrangement 2. In contrast to the cooling apparatus according to the invention, a portion of the cable arrangement 2 here remains exposed to the air L. If the wind turbine 40 is operating at full power, a "hot spot" H can occur. Such a "hot spot" lowers the carrying capacity of the energy sources, and therefore the power of the wind turbine 40 has to be restricted.

To finish off, it should be pointed out once again that the structures described above are exemplary embodiments, and that the basic principle can also be varied within wide limits by a person skilled in the art without constituting a departure from the scope of the invention, as predetermined by the claims. In particular, it is possible for the connecting elements and the pressure-monitoring unit to be configured in any desired manner. For the sake of completeness, it should also be pointed out that the use of the indefinite article "a" or "an" does not preclude the possibility of more than one of the features in question being present.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A cooling apparatus for cooling a cable arrangement, comprising:
   an outer pipe configured to accommodate the cable arrangement such that an interspace for accommodating a layer of cooling water remains between the outer pipe and the cable arrangement;
   a connecting element for establishing a water-tight connection between the outer pipe and the cable arrangement; and
   a pressure regulator for regulating a water pressure in the layer of cooling water.

2. The cooling apparatus as claimed in claim 1, wherein the connecting element is arranged in a region of an end point of the cable arrangement.

3. The cooling apparatus as claimed in claim 1, wherein an end point of the cable arrangement is arranged on a wind turbine.

4. The cooling apparatus as claimed claim 1, wherein the connecting element comprises a weld-seam-connecting device for establishing a weld-seam connection between the cable arrangement and the outer pipe.

5. The cooling apparatus as claimed in claim 4, wherein the weld-seam connection comprises a first weld seam, which is arranged between the connecting element and the outer pipe, and a second weld seam, which is arranged between the connecting element and the cable arrangement.

6. The cooling apparatus as claimed in claim 1, containing an entry opening for the introducing of cooling water into the interspace.

7. The cooling apparatus as claimed in claim 1, containing a pressure-monitoring unit for monitoring the water pressure in the layer of cooling water.

8. The cooling apparatus as claimed in claim 7, wherein the pressure-monitoring unit comprises an expansion tank.

9. A cable apparatus comprising a power-cable arrangement, and a cooling apparatus as claimed in claim 1.

10. A wind farm containing a plurality of cable arrangements for transmitting electric power from a plurality of wind turbines, and also containing a number of cooling apparatuses as claimed claim 1 for cooling the cable arrangements.

11. The wind farm as claimed in claim 10, containing at least one offshore wind turbine, wherein a cable arrangement of the plurality of cable arrangements extends from a lower region of the offshore wind turbine, through an air space, into the sea.

12. The wind farm as claimed in claim 10, wherein a connecting element of the cooling apparatus is arranged in a region of the air space.

13. The wind farm as claimed in claim 10, containing a control device for controlling the plurality of wind turbines in accordance with a pressure monitored in a layer of water of the cooling apparatus.

14. A method of providing a cooling apparatus for a power-cable arrangement, comprising:
   1) accommodating the power-cable arrangement an outer pipe so that an interspace for accommodating a layer of cooling water remains between the outer pipe and the power-cable arrangement;
   2) establishing a water-tight connection between the power-cable arrangement and the outer pipe;
   3) filling the interspace with a layer of water; and
   4) regulating a water pressure in the layer of water.

15. The method as claimed in claim 14, wherein, prior to step 1), air pockets are washed out of the outer pipe and/or a pig is guided through the outer pipe.

* * * * *